(12) United States Patent
Zhang et al.

(10) Patent No.: US 11,370,124 B2
(45) Date of Patent: Jun. 28, 2022

(54) METHOD AND SYSTEM FOR OBJECT TRACKING IN ROBOTIC VISION GUIDANCE

(71) Applicant: ABB Schweiz AG, Baden (CH)

(72) Inventors: Biao Zhang, West Hartford, CT (US);
Jianjun Wang, West Hartford, CT (US); Yixin Liu, New Britain, CT (US);
Saumya Sharma, Hartford, CT (US);
Jorge Vidal-Ribas, Sant Cugat del Vallès (ES); Jordi Artigas, Barcelona (ES); Ramon Casanelles, Sant Cugat del Vallès (ES)

(73) Assignee: ABB Schweiz AG, Baden (CH)

( * ) Notice: Subject to any disclaimer, the term of this patent is extended or adjusted under 35 U.S.C. 154(b) by 247 days.

(21) Appl. No.: 16/856,508

(22) Filed: Apr. 23, 2020

(65) Prior Publication Data
US 2021/0331322 A1  Oct. 28, 2021

(51) Int. Cl.
*B25J 13/08* (2006.01)
*B25J 9/16* (2006.01)

(52) U.S. Cl.
CPC ........... *B25J 9/1697* (2013.01); *B25J 9/1684* (2013.01); *B25J 13/089* (2013.01); *B25J 13/085* (2013.01)

(58) Field of Classification Search
CPC ...... B25J 9/1697; B25J 9/1684; B25J 13/085; B25J 13/089
USPC .................................. 700/213; 600/301, 118
See application file for complete search history.

(56) References Cited

U.S. PATENT DOCUMENTS

| 6,044,308 | A | 3/2000 | Huissoon |
| 8,571,293 | B2 | 10/2013 | Ernst et al. |
| 2007/0073439 | A1 | 3/2007 | Habibi et al. |
| 2011/0157577 | A1 | 6/2011 | Dohse |
| 2011/0206236 | A1* | 8/2011 | Center, Jr. .............. G06T 7/593 382/103 |
| 2011/0263946 | A1* | 10/2011 | el Kaliouby ............. A61B 5/16 600/300 |
| 2014/0007398 | A1 | 1/2014 | Kaneyasu et al. |
| 2014/0267397 | A1* | 9/2014 | Wagner ..................... G06T 7/74 382/103 |

(Continued)

OTHER PUBLICATIONS

International Search Report and Written Opinion, PCT Appln. No. PCT/US21/28581, dated Jul. 21, 2021, 8 pgs.

*Primary Examiner* — Dalena Tran
(74) *Attorney, Agent, or Firm* — Leydig, Voit & Mayer, Ltd.

(57) ABSTRACT

A system and method for predicting the location at which a feature that is being tracked during a robotic assembly operation will be located within one or more images captured by a vision device. A vision device can be mounted to a robot such that the location of the vision device as the robot moves can be known or determined. In the event of an interruption of the tracking of the feature by the vision device as the corresponding workpiece is moving, the location of the feature relative to a vision device can be predicted, such as, via use of current or past historical movement information for the feature and/or the associated workpiece. Using the predicted location of the feature and the known location of the vision device, the location at which the feature will be located in an image(s) captured by the vision device can be predicted.

20 Claims, 5 Drawing Sheets

(56) References Cited

U.S. PATENT DOCUMENTS

2019/0026958 A1\* 1/2019 Gausebeck ........... G06T 19/006
2021/0012520 A1\* 1/2021 Zhou ..................... G01C 11/08

\* cited by examiner

METHOD AND SYSTEM FOR OBJECT TRACKING IN ROBOTIC VISION GUIDANCE

FIELD OF INVENTION

The present invention relates to robotic assemblies, and more particularly, to robust and relatively fast object tracking by a vision guidance system.

BACKGROUND

A variety of operations can be performed during the final trim and assembly (FTA) stage of automotive assembly, including, for example, door assembly, cockpit assembly, and seat assembly, among other types of assemblies. Yet, for a variety of reasons, only a relatively small number of FTA tasks are typically automated. For example, often during the FTA stage, while an operator is performing an FTA operation, the vehicle(s) undergoing FTA is/are being transported on a line(s) that is/are moving the vehicle(s) in a relatively continuous manner. Yet such continuous motions of the vehicle(s) can cause or create certain irregularities with respect to at least the movement and/or position of the vehicle(s), and/or the portions of the vehicle(s) that are involved in the FTA. Moreover, such motion can cause the vehicle to be subjected to movement irregularities, vibrations, and balancing issues during FTA, which can prevent, or be adverse to, the ability to accurately model or predict the location of a particular part, portion, or area of the vehicle that directly involved in the FTA. Further, such movement irregularities can prevent the FTA from having a consistent degree of repeatability in terms of the movement and/or positioning of each vehicle, or its associated component, as each subsequent vehicle and/or component passes along the same area of the assembly line. Accordingly, such variances and concerns regarding repeatability can often preclude the use of traditional teach and repeat position based robot motion control in FTA operations.

Accordingly, although various robot control systems are available currently in the marketplace, further improvements are possible to provide a system and means to calibrate and tune the robot control system to accommodate such movement irregularities.

BRIEF SUMMARY

An aspect of an embodiment of the present application is a method that can include monitoring a movement of a robot, and tracking, using a vision device mounted to the robot, a location of a tracking feature of a workpiece. Additionally, a location of the tracking feature relative to the vision device can be predicted as the tracking feature moves. The method can also include predicting, using at least the predicted location of the tracking feature relative to the vision device, a captured location at which the tracking feature will be located within one or more images captured by the vision device, detecting, using the predicted captured location, the tracking feature within the one or more images.

Another aspect of an embodiment of the present application is a method that can include monitoring a movement of a robot and determining, using the monitored movement of the robot, a location of a vision device that is mounted to the robot. The method can also include tracking, using the vision device, a location of a tracking feature of a workpiece as the workpiece moves, and predicting, in response to an interference in the tracking of the tracking feature, a location of the tracking feature relative to the vison device using at least movement information of at least one of the workpiece and the tracking feature. Additionally, the method can include predicting, using at least the predicted location of the tracking feature and the determined location of the vision device, a captured location at which the tracking feature will be located within one or more images captured by the vision device, and detecting, using the predicted captured location, the tracking feature within the one or more images.

Additionally, an aspect of an embodiment of the present application is a method that can include monitoring a movement of a robot, tracking, using a first vision device mounted to the robot, a tracking feature of a workpiece, and tracking, using a second vision device, the tracking feature, the second vision device being at a relatively static position. Further, the tracking information obtained by both the first vision device and the second vision device from tracking the tracking feature can be combined and used to generate a three-dimensional a pose of the tracking feature. The method can also include predicting, as the tracking feature moves, a location of the pose, the predicted location providing predicted coordinates for the pose, and predicting, using at least the predicted location of the pose and the monitored movement of the robot, a captured location at which the pose will be located within one or more images captured by the first vision device. Further, using the predicted captured location, the pose can be detected within the one or more images.

These and other aspects of the present application will be better understood in view of the drawings and following detailed description.

BRIEF DESCRIPTION OF THE DRAWINGS

The description herein makes reference to the accompanying figures wherein like reference numerals refer to like parts throughout the several views.

The description herein makes reference to the accompanying figures wherein like reference numerals refer to like parts throughout the several views.

DESCRIPTION OF THE ILLUSTRATED EMBODIMENTS

Figure 1:
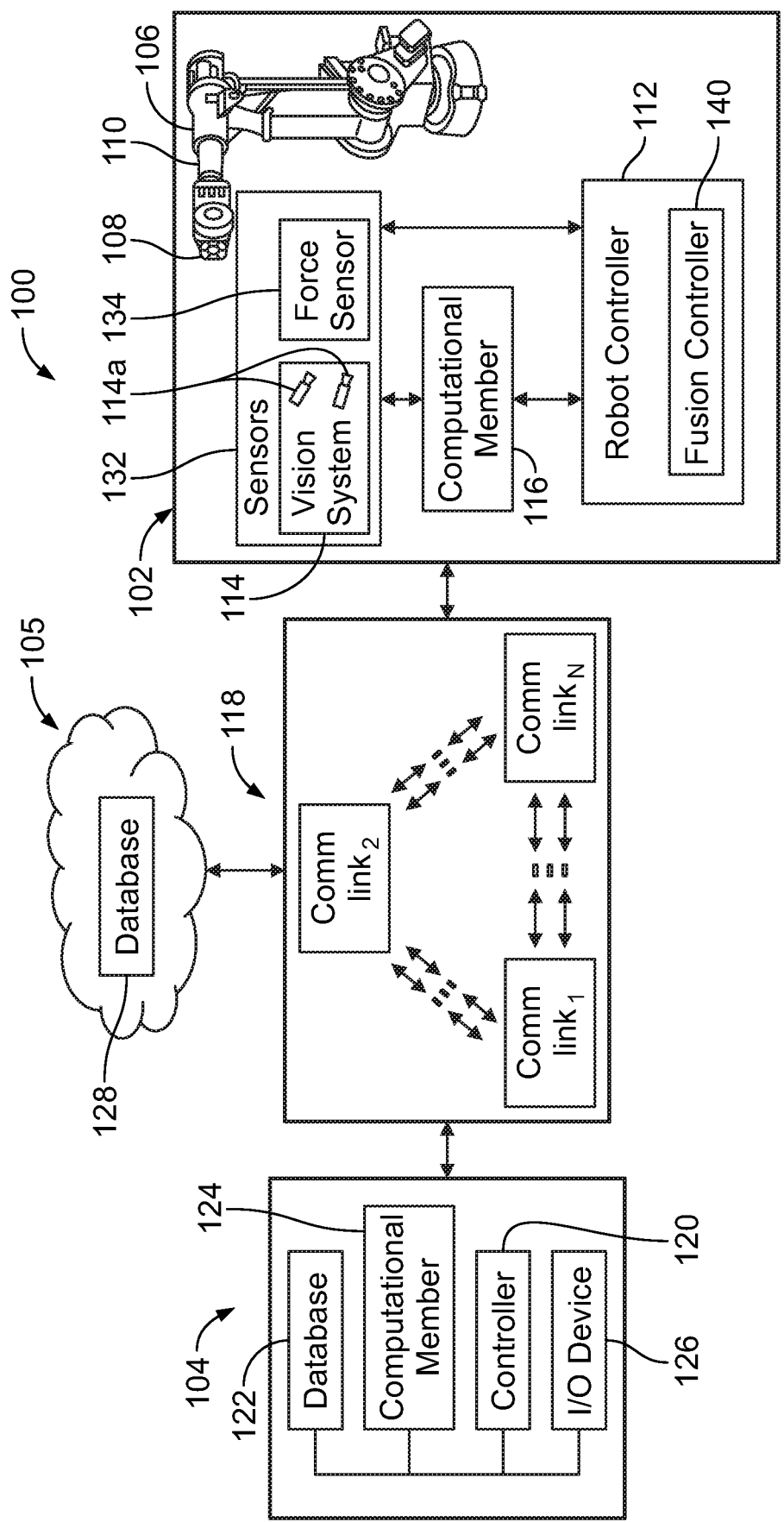
FIG. 1 illustrates a schematic representation of at least a portion of an exemplary robot system according to an illustrated embodiment of the present application.

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates at least a portion of an exemplary robot system 100, which can be a sensor fusion robot system, that includes at least one robot station 102 that is communicatively coupled to at least one robotic control system 104, such as, for example, via a communication network or link 118. The robotic control system 104 can be local or remote relative to the robot station 102. Further, according to certain embodiments, the robot station 102 can also include, or be in operable communication with, one or more supplemental database systems 105 via the communication network or link 118. The supplemental database system(s) 105 can have a variety of different configurations. For example, according to the illustrated embodiment, the supplemental database system(s) 105 can be, but is not limited to, a cloud based database.

According to the illustrated embodiment, the robotic control system 104 can include at least one controller 120, a database 122, the computational member 124, and/or one or more input/output (I/O) devices 126. The robotic control system 104 can be configured to provide an operator direct control of the robot 106, as well as to provide at least certain programming or other information to the robot station 102 and/or for the operation of the robot 106. Moreover, the robotic control system 104 can be structured to receive commands or other input information from an operator of the robot station 102 or of the robotic control system 104, including, for example, via commands generated via operation or selective engagement of/with an input/output device 126. Such commands via use of the input/output device 126 can include, but are not limited to, commands provided through the engagement or use of a microphone, keyboard, touch screen, joystick, stylus-type device, and/or a sensing device that can be operated, manipulated, and/or moved by the operator, among other input/output devices. Further, according to certain embodiments, the input/output device 126 can include one or more monitors and/or displays that can provide information to the operator, including, for, example, information relating to commands or instructions provided by the operator of the robotic control system 104, received/transmitted from/to the supplemental database system(s) 105 and/or the robot station 102, and/or notifications generated while the robot 102 is running (or attempting to run) a program or process. For example, according to certain embodiments, the input/output device 126 can display images, whether actual or virtual, as obtained, for example, via use of at least a vision device 114a of a vision guidance system 114.

The robotic control system 104 can include any type of computing device having a controller 120, such as, for example, a laptop, desktop computer, personal computer, programmable logic controller (PLC), or a mobile electronic device, among other computing devices, that includes a memory and a processor sufficient in size and operation to store and manipulate a database 122 and one or more applications for at least communicating with the robot station 102 via the communication network or link 118. In certain embodiments, the robotic control system 104 can include a connecting device that can communicate with the communication network or link 118 and/or robot station 102 via an Ethernet WAN/LAN connection, among other types of connections. In certain other embodiments, the robotic control system 104 can include a web server, or web portal, and can use the communication network or link 118 to communicate with the robot station 102 and/or the supplemental database system(s) 105 via the internet.

The supplemental database system(s) 105, if any, can also be located at a variety of locations relative to the robot station 102 and/or relative to the robotic control system 104. Thus, the communication network or link 118 can be structured, at least in part, based on the physical distances, if any, between the locations of the robot station 102, robotic control system 104, and/or supplemental database system(s) 105. According to the illustrated embodiment, the communication network or link 118 comprises one or more communication links 128 (Comm link$_{1-N}$ in FIG. 1). Additionally, the system 100 can be operated to maintain a relatively reliable real-time communication link, via use of the communication network or link 118, between the robot station 102, robotic control system 104, and/or supplemental database system(s) 105. Thus, according to certain embodiments, the system 100 can change parameters of the communication link 128, including, for example, the selection of the utilized communication links 128, based on the currently available data rate and/or transmission time of the communication links 128.

The communication network or link 118 can be structured in a variety of different manners. For example, the communication network or link 118 between the robot station 102, robotic control system 104, and/or supplemental database system(s) 105 can be realized through the use of one or more of a variety of different types of communication technologies, including, but not limited to, via the use of fiber-optic, radio, cable, or wireless based technologies on similar or different types and layers of data protocols. For example, according to certain embodiments, the communication network or link 118 can utilize an Ethernet installation(s) with wireless local area network (WLAN), local area network (LAN), cellular data network, Bluetooth, ZigBee, point-to-point radio systems, laser-optical systems, and/or satellite communication links, among other wireless industrial links or communication protocols.

The database 122 of the robotic control system 104 and/or one or more databases 128 of the supplemental database system(s) 105 can include a variety of information that can be used in the identification of elements within the robot station 102 in which the robot 106 is operating. For example, one or more of the databases 122, 128 can include or store information that is used in the detection, interpretation, and/or deciphering of images or other information detected by a vision guidance system 114, such as, for example, information related to tracking feature(s) that may be detected in an image(s) captured by the by the vision guidance system 114. Additionally, or alternatively, such databases 122, 128 can include information pertaining to one or more sensors 132, including, for example, information pertaining to forces, or a range of forces, that are to be expected to be detected by via use of one or more force sensors 134 at one or more different locations in the robot station 102 and/or along the workpiece 144 at least as work is performed by the robot 106.

The database 122 of the robotic control system 104 and/or one or more databases 128 of the supplemental database system(s) 105 can also include information that can assist in discerning other features within the robot station 102. For example, images that are captured by the one or more vision devices 114a of the vision guidance system 114 can be used in identifying, via use of information from the database 122, components within the robot station 102, including FTA components that are within a picking bin, among other components, that may be used by the robot 106 in performing FTA on a workpiece, such as, for example, a car body or vehicle.

According to certain embodiments, the robot station 102 includes one or more robots 106 having one or more degrees of freedom. For example, according to certain embodiments, the robot 106 can have, for example, six degrees of freedom. According to certain embodiments, an end effector 108 can be coupled or mounted to the robot 106. The end effector 108 can be a tool, part, and/or component that is mounted to a wrist or arm 110 of the robot 106. Further, at least portions of the wrist or arm 110 and/or the end effector 108 can be moveable relative to other portions of the robot 106 via operation of the robot 106 and/or the end effector 108, such for, example, by an operator of the robotic control system 104 and/or by programming that is executed to operate the robot 106.

The robot 106 can be operative to position and/or orient the end effector 108 at locations within the reach of a work envelope or workspace of the robot 106, which can accommodate the robot 106 in utilizing the end effector 108 to perform work, including, for example, grasp and hold one or more components, parts, packages, apparatuses, assemblies, or products, among other items (collectively referred to herein as "components"). A variety of different types of end effectors 108 can be utilized by the robot 106, including, for example, a tool that can grab, grasp, or otherwise selectively hold and release a component that is utilized in a final trim and assembly (FTA) operation during assembly of a vehicle, among other types of operations.

Figure 2:
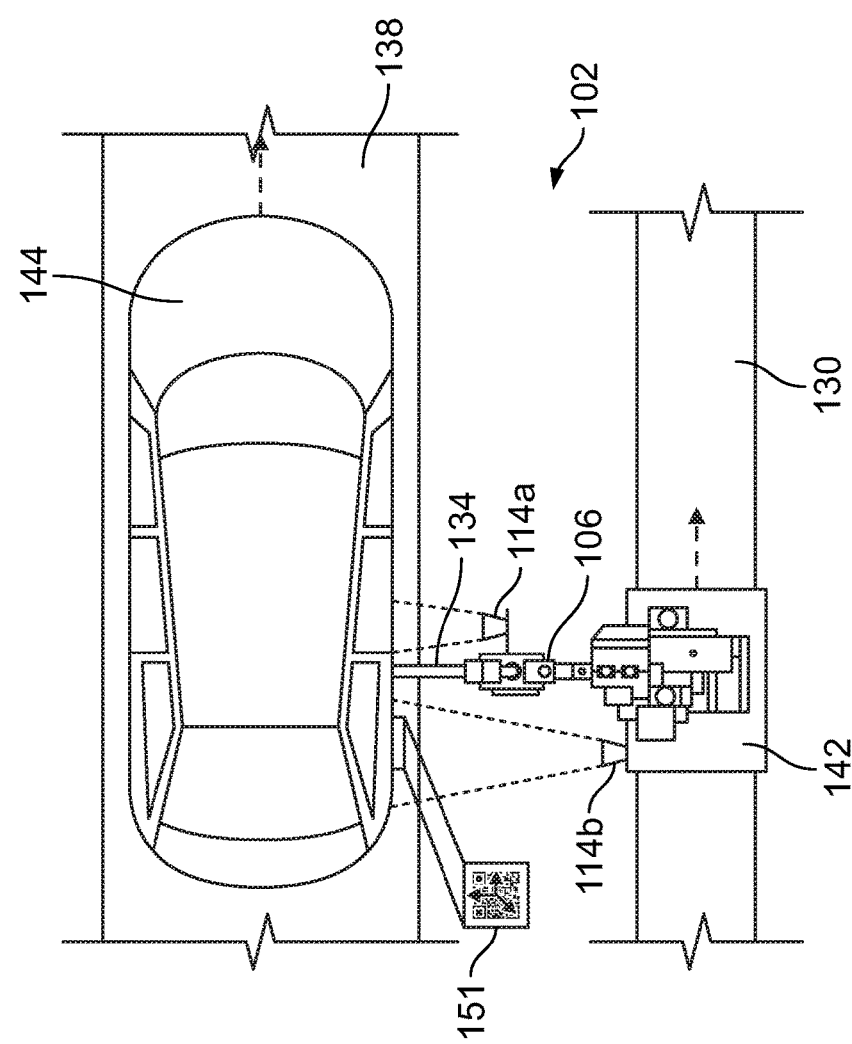
FIG. 2 illustrates a schematic representation of an exemplary robot station through which workpieces are moved by an automatic guided vehicle (AGV) or conveyor, and in which a robot mounted to a robot base is moveable along, or by, a track.

The robot 106 can include, or be electrically coupled to, one or more robotic controllers 112. For example, according to certain embodiments, the robot 106 can include and/or be electrically coupled to one or more controllers 112 that may, or may not, be discrete processing units, such as, for example, a single controller or any number of controllers. The controller 112 can be configured to provide a variety of functions, including, for example, be utilized in the selective delivery of electrical power to the robot 106, control of the movement and/or operations of the robot 106, and/or control the operation of other equipment that is mounted to the robot 106, including, for example, the end effector 108, and/or the operation of equipment not mounted to the robot 106 but which are an integral to the operation of the robot 106 and/or to equipment that is associated with the operation and/or movement of the robot 106. Moreover, according to certain embodiments, the controller 112 can be configured to dynamically control the movement of both the robot 106 itself, as well as the movement of other devices to which the robot 106 is mounted or coupled, including, for example, among other devices, movement of the robot 106 along, or, alternatively by, a track 130 or mobile platform such as the automated guided vehicle (AGV) to which the robot 106 is mounted via a robot base 142, as shown in FIG. 2.

The controller 112 can take a variety of different forms, and can be configured to execute program instructions to perform tasks associated with operating the robot 106, including to operate the robot 106 to perform various functions, such as, for example, but not limited to, the tasks described herein, among other tasks. In one form, the controller(s) 112 is/are microprocessor based and the program instructions are in the form of software stored in one or more memories. Alternatively, one or more of the controllers 112 and the program instructions executed thereby can be in the form of any combination of software, firmware and hardware, including state machines, and can reflect the output of discreet devices and/or integrated circuits, which may be co-located at a particular location or distributed across more than one location, including any digital and/or analog devices configured to achieve the same or similar results as a processor-based controller executing software or firmware based instructions. Operations, instructions, and/or commands determined and/or transmitted from the controller 112 can be based on one or more models stored in non-transient computer readable media in a controller 112, other computer, and/or memory that is accessible or in electrical communication with the controller 112.

According to the illustrated embodiment, the controller 112 includes a data interface that can accept motion commands and provide actual motion data. For example, according to certain embodiments, the controller 112 can be communicatively coupled to a pendant, such as, for example, a teach pendant, that can be used to control at least certain operations of the robot 106 and/or the end effector 108.

The robot station 102 and/or the robot 106 can also include one or more sensors 132, as well as other forms of input devices. Examples of sensors 134 that may be utilized in connection with the operation of the robot 106, and which may also provide information to a fusion controller 140 for sensor fusion includes, for example, vision sensors, force sensors, motion sensors, acceleration sensors, and/or depth sensors, among other types of sensors. Further, information provided by at least some of the sensors 132 can be integrated, including, for example, via operation of a fusion controller 140, such that operations and/or movement, among other tasks, by the robot 106 can at least be guided via sensor fusion. Such a fusion controller 140 can be part of, or otherwise communicatively coupled to, a controller 112 and/or a computational member 116 of the robotic control system 104. Moreover, information provided by the one or more sensors 132, such as, for example, the vision guidance system 114 and force sensors 134, among other sensors 132, can be processed by the fusion controller 140 such that the information provided by the different sensors 132 can be combined or integrated in a manner that can reduce the degree of uncertainty in the movement and/or performance of tasks by the robot 106. Thus, according to certain embodiments, at least a plurality of the sensors 132 can provide information to the fusion controller 140 that the fusion controller 140 can use to determine a location to which the robot 106 is to move and/or to which the robot 106 is to move a component that is to be assembled to a workpiece. Further, the fusion controller 140 can also be communicatively coupled to the exchange information and data with the robot 106.

According to the illustrated embodiment, the vision guidance system 114 can comprise one or more vision devices 114a, 114b that can be used in connection with observing at least portions of the robot station 102, including, but not limited to, observing, workpieces 144 and/or components that can be positioned in, or are moving through or by at least a portion of, the robot station 102. For example, according to certain embodiments, the vision guidance system 114 can visually detect, track, and extract information, various types of visual features that can be part of, or otherwise positioned on or in proximity to, the workpiece 144 and/or components that are in the robot station 102. For example, the vision guidance system 114 can track and capture images of, as well as possibly extract information from such images, regarding visual tracking features that are part of, or positioned on a FTA component and/or car body that is/are involved in an assembly process, and/or on automated guided vehicle (AGV) that is moving the workpiece through the robot station 102.

Examples of vision devices 114a, 114b of the vision guidance system 114 can include, but are not limited to, one or more imaging capturing devices, such as, for example, one or more two-dimensional, three-dimensional, and/or RGB cameras. Additionally, the vision devices 114a, 114b can be mounted at a variety of different locations within the robot station 102, including, for example, mounted generally above the working area of the robot 106, mounted to the robot 106, the end effector 108 of the robot 106, and/or the base 142 on which the robot 106 is mounted and/or displaced, among other locations. For example, FIG. 2 illustrates a robot station 102 in which a first vision device 114a is attached to a robot 106, and a second vision device 114b is mounted to the robot base 142 onto which the robot 106 is mounted. However, the one or more vision devices 114a, 114b can be positioned at a variety of different locations, including, for example, above the robot 106 and/or at a location at which the vision device 114a, 114b generally does not move, among other locations.

According to certain embodiments, the vision guidance system 114 can have data processing capabilities that can process data or information obtained from the vision devices 114a, 114b. Additionally, such processed information can be communicated to the controller 112 and/or fusion controller 140. Alternatively, according to certain embodiments, the vision guidance system 114 may not have data processing capabilities. Instead, according to certain embodiments, the vision guidance system 114 can be electrically coupled to a computational member 116 of the robot station 102 that is adapted to process data or information outputted from the vision guidance system 114. Additionally, according to certain embodiments, the vision guidance system 114 can be operably coupled to a communication network or link 118, such that information outputted by the vision guidance system 114 can be processed by a controller 120 and/or a computational member 124 of the robotic control system 104, as discussed below.

Thus, according to certain embodiments, the vision guidance system 114 or other component of the robot station 102 can be configured to search for certain tracking features within an image(s) that is/are captured by the one or more vision devices 114a, 114b and, from an identification of the tracking feature(s) in the captured image, determine position information for that tracking feature(s). Information relating to the determination of a location of the tracking feature(s) in the captured image(s) can be used, for example, by the vision serving of the control system 104, as well as stored or recorded for later reference, such as, for example, in a memory or database of, or accessible by, the robotic control system 104 and/or controller 112. Moreover, information obtained by the vision guidance system 114 can be used to at least assist in guiding the movement of the robot 106, the robot 106 along a track 130 or mobile platform such as the AGV 138, and/or movement of an end effector 108.

According to certain embodiments, the first and second vision devices 114a, 114b can each individually track at least artificial tracking features and/or natural tracking features. Artificial tracking features can be features that are configured to be, and/or are at a location in the robot station 102, that may be less susceptible to noise, including, for example, noise associated with lighting, movement irregularities, vibrations, and balancing issues, than natural tracking features. Thus, such artificial tracking features can be, but are not limited to, items and/or features that are configured and/or position primarily for use by the vision guidance system 114, and can include, but are not limited to, a quick response (QR) code 150, as shown, for example, in FIGS. 2 and 3. Alternatively, or additionally, rather than utilizing artificial tracking features, portions of the workpiece 144, or related components, can be utilized that are at a location that is generally less susceptible to noise, including noise associated with movement caused by natural forces, than other portions of the workpiece 144.

Figure 4:
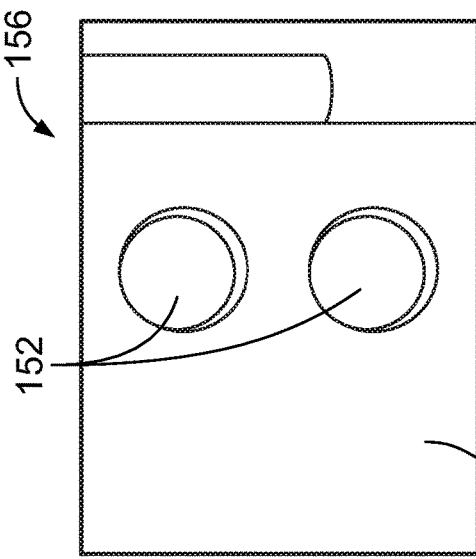
FIG. 4 illustrates an exemplary second or nature tracking feature in an image captured by a vision device of a vision system according to an illustrated embodiment of the subject application.

With respect to natural tracking features, such features can include, but are not limited to, features of the workpiece 144 at or around the location at which a component will be located, contacted, moved, and/or identified along the workpiece 144 during actual operation of the robot 106. For example, FIG. 4 provides one example of natural tracking features in the form of side holes 152 in a workpiece 144. Thus, the natural tracking features may be related to actual intended usage of the robot 106, such as, for example locating relatively small holes that will be involved in an assembly operation. Accordingly, in view of at least the size, location, and/or configuration, among other factors, natural tracking features can be inherently more susceptible to a relatively higher level of noise than the artificial tracking features. As such relatively higher levels of noise can adversely affect the reliability of the information obtained by the sensors 132, artificial tracking features may be used during different stages of an assembly process than natural tracking features.

The force sensors 134 can be configured to sense contact force(s) during the assembly process, such as, for example, a contact force between the robot 106, the end effector 108, and/or a component being held by the robot 106 with the workpiece 144 and/or other component or structure within the robot station 102. Such information from the force sensor(s) 134 can be combined or integrated, such as, for example, by the fusion controller 140, with information provided by the vision guidance system 114, including for example, information derived in processing images of tracking features, such that movement of the robot 106 during assembly of the workpiece 144 is guided at least in part by sensor fusion.

Figure 3:
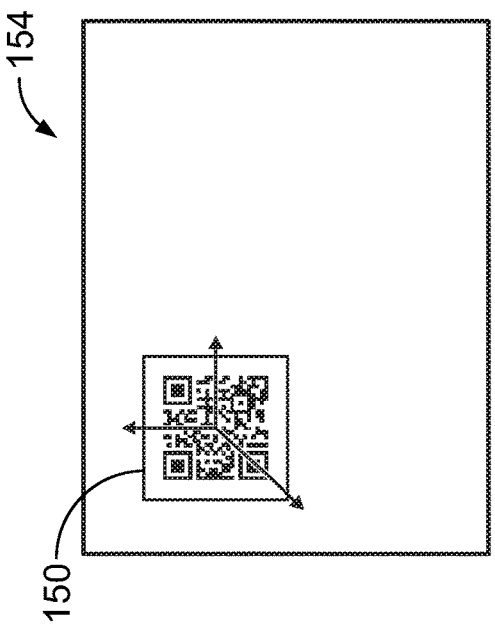
FIG. 3 illustrates an exemplary first or artificial tracking feature in an image captured by a vision device of a vision system according to an illustrated embodiment of the subject application.

FIG. 2 illustrates a schematic representation of an exemplary robot station 102 through which workpieces 144 in the form of car bodies are moved by the automated or automatic guided vehicle (AGV) 138, and which includes a robot 106 that is mounted to a robot base 142 that is moveable along, or by, a track 130 or mobile platform such as the AGV 138. While for at least purposes of illustration, the exemplary robot station 102 depicted in FIG. 2 is shown as having, or being in proximity to, a workpiece 144 and associated AGV 138, the robot station 102 can have a variety of other arrangements and elements, and can be used in a variety of other manufacturing, assembly, and/or automation processes. Additionally, while the examples depicted in FIGS. 1 and 3 illustrate a single robot station 102, according to other embodiments, the robot station 102 can include a plurality of robot stations 102, each station 102 having one or more robots 106. The illustrated robot station 102 can also include, or be operated in connection with, one or more AGVs 138, supply lines or conveyors, induction conveyors, and/or one or more sorter conveyors. According to the illustrated embodiment, the AGV 138 can be positioned and operated relative to the one or more robot stations 102 so as to transport, for example, workpieces 144 that can receive, or otherwise be assembled with or to include, via operation of the robot 106, one or more components. For example, with respect to embodiments in which the workpiece 144 is a car body or vehicle, such components can include a door assembly, cockpit assembly, and seat assembly, among other types of assemblies and components.

Similarly, according to the illustrated embodiment, the track 130 can be positioned and operated relative to the one or more robots 106 so as to facilitate assembly by the robot(s) 106 of components to the workpiece(s) 144 that is/are being moved via the AGV 138. Moreover, the track 130 or mobile platform such as the AGV, robot base 142, and/or robot can be operated such that the robot 106 is moved in a manner that at least generally follows the movement of the AGV 138, and thus the movement of the workpiece(s) 144 that is/are on the AGV 138. Further, as previously mentioned, such movement of the robot 106 can also include movement that is guided, at least in part, by information provided by the vision guidance system 114, one or more force sensor(s) 134, among other sensors 132.

Figure 5:
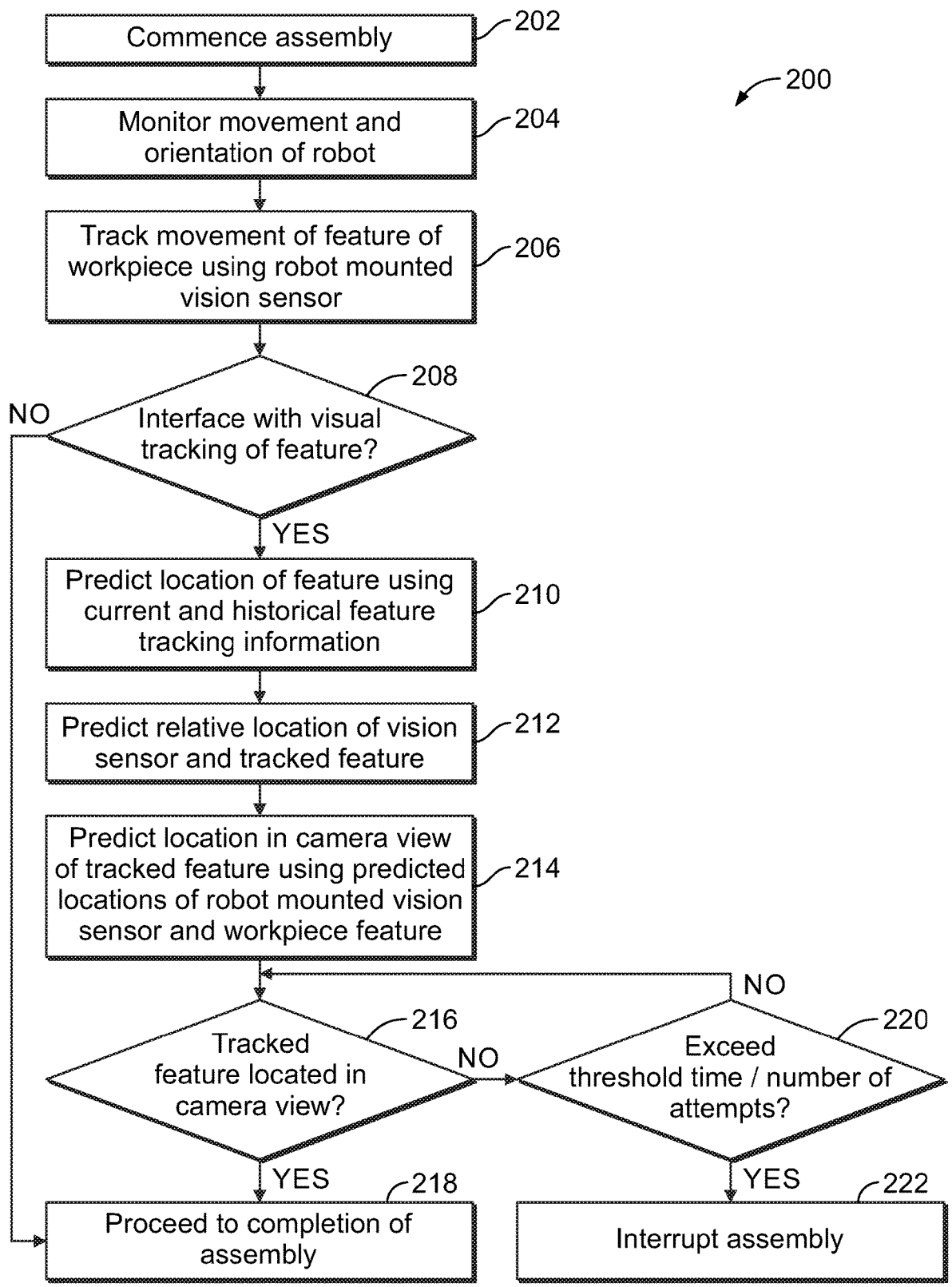
FIG. 5 illustrates a process for visual object tracking for a robot system according to an embodiment of the subject application.

FIG. 5 illustrates a process 200 for visual object tracking for a robot system 100 according to an embodiment of the subject application. The operations illustrated for all of the processes in the present application are understood to be examples only, and operations may be combined or divided, and added or removed, as well as re-ordered in whole or in part, unless explicitly stated to the contrary. The process 200 can include use of a vision device 114a that is mounted to the robot 106. At step 202, the process can begin with the commencement of an assembly cycle, such as, for example, an assembly cycle in which the robot 106 is to attach a component, such as, for example, a car door, to a workpiece 144, such as, for example, a car body. At step 204, the position and orientation, collectively referred to as location, of the robot 106 can be monitored. According to certain embodiments, monitoring the location of the robot 106 can include tracking movement of the robot 106, identifying positional location, such as, for example, coordinates of the robot 106, and measuring the degree of linear, angular, and/or rotational displacement of the robot 106, as well as a combination thereof, among other manners of tracking the movement of the robot 106. Further, according to at least certain embodiments, monitoring of the robot 106 can generally occur at least through the duration of the assembly cycle. Further, the location of the robot 106 can be relative to one or more reference locations, including, for example a reference point in the robot station 102, among other locations.

According to such an embodiment, the location of the vision device 114a can also be known and/or determined. For example, as the vision device 114a is mounted to the robot 106, the location of the vision device 114a, or the location at which the vision device 114a is mounted to the robot 106, can at least be initially known relative to a reference location of the robot 106. Thus, by knowing at least the location of the robot 106, including, for example, the orientation and position of the robot 106 from the information obtained, for example, at step 204, the corresponding location of the vision device 114a can be calculated or otherwise determined at least relative to the robot 106. Such information can also similarly be used to determine the location of the vision device 114a relative to other possible reference locations, such as, for example, a reference location in the robot station 102 that may also serve as the reference point for at least the robot 106, as previously discussed.

At step 206, the vision device 114a that is mounted to the robot 106 can track the movement of a tracking feature 150, 152 as the workpiece 144 moves along the AGV 138. As previously mentioned, the tracking feature 150, 152 may, or may not, be an artificial or natural tracking feature 150, 152, and thus may be part of, on, and/or around the workpiece 144 as the workpiece 144 is generally continuously moved during the assembly, such as, for example, along the AGV 138.

During the assembly associated with the process 200, instance(s) can arise in which noise infers with the ability of the vision device 114a to accurately capture the tracking feature 150, 152, and/or capture the tracking feature 150, 152 with sufficient clarity. For example, at certain times, a shadow can appear over the tracking feature 150, 152, the tracking feature 150, 152 may pass through an area in which there is insufficient illumination, and/or the workpiece 144 and/or robot may vibrate, among other forms of noise, in manners that can interfere with the ability of the vision device 114a to detect the tracking feature 150, 152, and/or detect the tracking feature 150, 152 with sufficient definition or clarity in the captured image. Traditionally, without being able to detect the tracking feature 150, 152, the robot 106 may not be able to determine where to move, and/or where to move the component that the robot 106 is (or will be) assembling to the workpiece 144, which can thus result in stoppage in the robot 106, and at least temporary failure of the assembly process.

However, according to the illustrated embodiment, upon detection at step 208 of interference with the visual tracking of the tracking feature 150, 152, at step 210 a location of the tracking feature 150, 152 can be predicted using historical information regarding the movement of the tracking feature 150, 152 and/or the associated workpiece 144. For example, according to certain embodiments, the vision guidance system 114 or a another controller or system of the robot system 100 can at least at, or just prior to, the occurrence of the interference, record information regarding the location of the tracking feature 150, 152 and/or the workpiece 144. Additionally, information can be recorded during the assembly process regarding the movement of the tracking feature 150, 152 and/or workpiece 144, including information regarding the speed and/or acceleration/deceleration of the movement of the current workpiece 144 as the workpiece 144 was moving along the AGV 138. Such information can be used by the vision guidance system 114 or another controller or system of the robot system 100, such as, for example, via use of an algorithm, to predict a current location of the workpiece 144 and/or a location at which the workpiece 144 will reach. Further, by knowing the physical location of the tracking feature 150, 152 on, or relative to, the workpiece 144, information regarding the movement and/or location of the workpiece 144 can be used to determine or calculate similar information for the tracking feature 150, 152. Alternatively, or optionally, the prior historical information can also include information obtained during prior assembly cycles relating to the actual location of prior tracking features 150, 152 at generally the same actual location that step 210 is seeking to predict for the tracking features 150, 152 of the current(s) workpiece 144.

Further, according to embodiments in which the predicted location is a future location of the tracking feature 150, 152, the duration between the time at which the interference occurred and the time period associated with the predicted location of the tracking feature 150, 152 can be relatively small. Moreover, the selected duration of time may be based at least on an attempt to minimize the potential that the robot 106 is unsure of the direction(s) that the robot 106 should move, and thereby at least attempt to avoid a stoppage in the robot 106 that can result in an associated stoppage of the assembly process.

Using at least information obtained at steps 204 and 210, at step 212, the vision guidance system 114 or a another controller or system of the robot system 100, can predict the location of the workpiece 144, and moreover the portion of the workpiece 144 being tracked, relative to the vision device 114a. Such a predication can include, for example, a relative three-dimensional location, speed, and/or acceleration/deceleration of the workpiece 144, or portion thereof being tracked, relative to the vision device 114a. Further, such a prediction(s) at step 212 can be attained in a variety of manners, including, for example, via algorithms, modeling, machine learning, and/or deep learning, among other manners of obtaining such a prediction(s).

At step 214, the predicted information from step 212, such as, for example, the predicted three-dimensional location of the tracking device 114a relative to the workpiece 144, or portion thereof, being tracked, as well as other information, including, for example, the known physical location of the tracking feature 150, 152 on, or relative to, the workpiece 144, can be used to predict a location at which the tracking feature 150, 152 will be captured or seen in the image that is captured by the vision device 114a, such as, for example, a captured image 154, 156 as shown in FIGS. 3 and 4. Moreover, in instances in which the location of the vision device 114a is known or determined, the vision guidance system 114 can generally also know, or calculate, the locations of features in the robot station 102 that are seen in the image(s) 154, 156 that is/are captured by the vision device 114a. Thus, by knowing the predicted location of the vision device 114a, the location of the area seen in the image(s) 154, 156 that will be captured by the vision device 114a when the vision device 114a will be at the predicted location can also be predicted. Accordingly, by having the predicted location of the tracking feature 150, 152, and by knowing the corresponding predicted location for the vision device 114a, the location at which the tracking features 154, 156 will be in located an image(s) 154, 156 that will be captured by the vision device 114a can also be predicted. Thus, for example, the predicted location at step 214 can be an area or region in the captured image 154, 156 that is smaller than the entire area or region seen in the captured image 154, 156.

By limiting the area or region of the captured image(s) 154, 156 that is to be examined for detection of the tracking feature 150, 152, the speed at which the tracking feature 150, 152 can be detect and/or locate in the captured image(s) 154, 156 can be increased. Moreover, limiting the size of the area of the captured image(s) 154, 156 that is to be examined while locating the tracking feature 150, 152 can decrease the amount of data and information from the captured image(s) 154, 156 that the vision guidance system 114 or other controller or system is to process. Additionally, the predicted the three-dimensional location of the tracking workpiece 144 relative to vision device 114a, can, for example, be used to as an initial pose of the workpiece 144 to allow relatively fast and robust three-dimensional pose estimation of the workpiece 144, which can calculate the three-dimensional location and orientation of the workpiece 144 based on a two-dimensional tracking feature 150, 152 that can be captured by the vision device 114a in the captured image(s). Additionally, if the tracking feature 150, 152 is not presently in the view of the vision device 114a, the foregoing information can provide the vision guidance system 114 with information that can be used to relatively quickly determine the location at which the vision device 114a is to be moved, thereby allowing for a relatively fast and robust operation of the vision guidance system 114 and/or vision device 114a.

Figure 6:
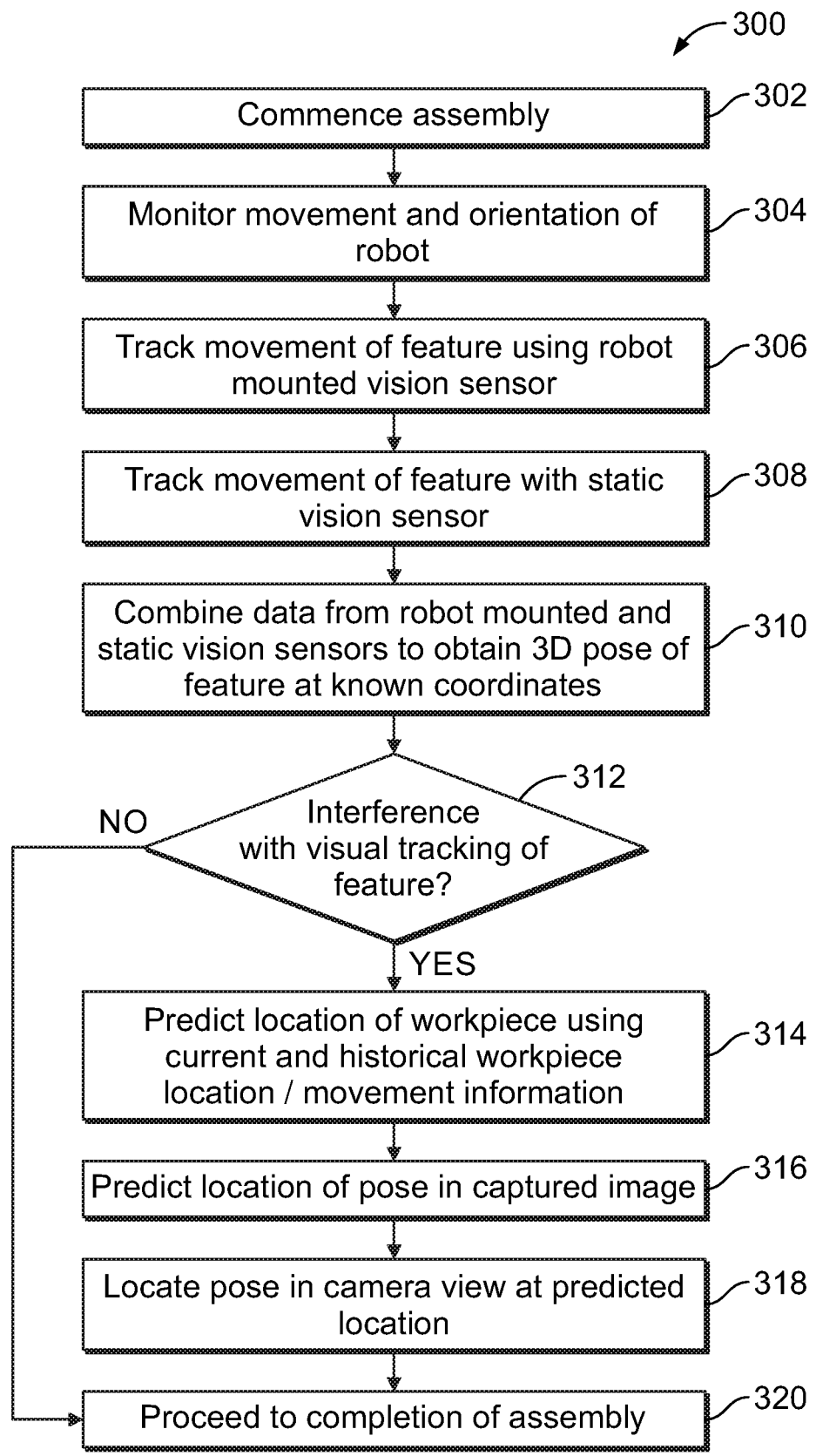
FIG. 6 illustrates a further process for visual object tracking for a robot system according to an embodiment of the subject application.

If at step 216 a determination is made that the tracking feature 150, 152 has successfully been located in the captured image 154, 156, the vision device 114a can continue to track the tracking feature, and the assembly can proceed toward completion at step 218. Additionally, at step 218, the predicted the three-dimensional location, speed, and/or acceleration/deceleration of the tracking workpiece 144 relative to vision device 114a that can be obtained at step 212, can be used to guide the movement of the vision device 114a mounted on robot 106 to maintain the tracking feature 150, 152 within the field of view (FOV) of the vision device 114a during the assembly. However, in the event the tracking feature is determined at step 220 to not have been located, then after a predetermined threshold, such as, for example, an expiration of a predetermined time period and/or after a predetermined number of unsuccessful attempts to at least both move the vision device 114a on the robot 106 to a location at which the tracking feature 150, 152 appear in the FOV of the vision device 114a and locate the tracking feature 150, 152 within the captured image 154, 156, then at step 222, the assembly process may at least be temporarily stopped or interrupted. [00511] FIG. 6 illustrates a further process for visual object tracking for a robot system according to an embodiment of the subject application. The process 300 can include use of a first vision device 114a that is mounted to the robot 106, as well as a second vision device 114b that is mounted, comparatively to at least the first vision device 114a, at a generally static position. For example, according to certain embodiments, the second vision device 114b can be mounted to a roof, ceiling, ground, base, or floor surface, or wall of the robot station 102. Alternatively, the second vision device 114b can be mounted to the base 142 to which the robot 106 is mounted. Thus, the location of the second vision device 114b can be generally known and remain static during the assembly process. Further the second vision device 114b can be positioned at a variety of different places within the robot station 102, including, for example, at a position at which the second vision device 114b can maintain the tracking feature 150, 152 that is being tracked by the second vision device 114b within the field of view (FOV) of the second vision device 114b. However, alternatively, according to other embodiments, rather than using a tracking feature 150, 152 that is to remain in the FOV of the second vision device 114b, other embodiments can utilize a visual ruler, such as, for example, a QR code tape that can, as the tracking feature 150, 152 is moved, provide a point(s) of reference as to the current location of the tracking feature 150, 152.

At step 302, the process can begin with the commencement of an assembly cycle, such as, for example, an assembly cycle in which the robot 106 is to attach a component, such as, for example, a car door, to a workpiece 144. Similar to steps 204 and 206 of the process 200 discussed above with respect to FIG. 5, at steps 304 and 306 of the process 300, the position and orientation, collectively referred to as location, of the robot 106 can be monitored, and the first vision device 114a that is mounted to the robot 106 can track the movement of a tracking feature 150, 152 as the workpiece 144 moves along the AGV 138. Additionally, as also discussed above with respect to process 200, as the first vision device 114a is mounted to the robot 106 at a known location relative to the robot 106, by knowing at least the location of the robot 106 via at least step 304, the corresponding location of the vision device 114a can be calculated or otherwise determined. Using such information, the location of the tracking feature 150, 152 being tracked by the first vision device 114a can be determined or calculated, such as, for example, by the vision guidance system 114 or a another controller or system of the robot system 100 using the information or data captured in one or more images 154, 156 by the vision device 114a. Such information can also be used to determine the location of associated the workpiece 144.

At step 308, the second, static vision device 114b can also track a tracking feature 150, 152 relating to the workpiece 144. According to certain embodiments, the tracking feature 150, 152 being tracked by the second vision device 114b can be the same feature as the tracking feature 150, 152 that is being tracked by the first vision device 114a. Similar to the first vision device 114a, data or information obtained by one or more images 154, 156 captured by the second vision device 114b while tracking of the tracking feature 150, 152 can be used to also determine a location of the tracking feature 150, 152.

At step 310, the information or data obtained by the first and second vision devices 114a, 114b when tracking the same tracking feature 150, 152 can be combined to determine an isolated three-dimensional (3D) pose of the tracking feature 150, 152 at one or more known coordinates, and/or at one or more coordinates relative to the first and/or second vision devices 114a, 114b. Such coordinates can include, for example, but are not limited to, general coordinates for a location within the robot station 102 (x, y, z) and/or of the robot 106 (rx, ry, rz), among other coordinates. For example, as the first and second vision devices 114a, 114b are at different locations, the images 154, 156 of the tracking feature 150, 152 at the same time can be from different, and known, locations and/or perspectives, and thus provide different information that can be used by the vision guidance system 114 or a another controller or system of the robot system 100 to derive a three-dimensional pose of the tracking feature 150, 152. Further, as the locations of the first and second vision devices 114a, 114b are known, as discussed above, such a three-dimensional pose of the tracking feature 150, 152 can be determined relative to the locations, including, for example, the coordinates, of the first and second vision devices 114a, 114b.

As previously discussed, during such assembly processes, as the workpiece 144 continuously moves, instance(s) can arise in which noise infers with the ability of the vision devices 114a, 114b to capture the tracking feature 150, 152, and/or to capture the tracking feature 150, 152 with sufficient clarity. Thus, upon detection at step 312 of interference with the visual tracking by the first and second vision devices 114a, 114b of the tracking feature 150, 152, at step 314 a location of the tracking feature 150, 152 can be predicted using historical information regarding the movement of the tracking feature 150, 152 and/or the associated workpiece 144.

For example, according to certain embodiments, the vision guidance system 114 or a another controller or system of the robot system 100 can at least at, or just prior to, the occurrence of the interference, record information regarding the location of the tracking feature 150, 152 and/or the workpiece 144. Additionally, information can be recorded during the assembly process 300 regarding the movement of the tracking feature 150, 152 and/or workpiece 144, including information regarding the speed and/or acceleration/deceleration of the movement of the current workpiece 144 as the workpiece 144 is moving along the AGV 138. Such information can be used by the vision guidance system 114 or a another controller or system of the robot system 100 to predict a current location of the workpiece 144 and/or a location at which the workpiece 144 will reach as the workpiece 144 is continuously moving.

Further, the predicted location of the workpiece 144 and/or tracking feature 150, 152 can be used to predict the current and/or future coordinates for the pose that was determined at step 310 in view of the continuous movement of the associated workpiece 144. For example, as previously mentioned, the coordinates of the pose can be generally known relative to the location of the tracking feature 154, 156 and/or workpiece 144. Thus, the predicted location of the tracking feature 154, 156 and/or of the workpiece 144 can also be used to predict corresponding coordinates for the pose.

Based on the foregoing, the location, including coordinates, of the first vision device 114a and/or the static second vision device 114b can be known relative to the predicted location(s) of the workpiece 144 and/or tracking feature 154, 156. Additionally, as the tracking feature 150, 152 can be positioned on, or about the workpiece 144, at a known relative location, the location of the three-dimensional pose of the tracking feature 150, 152 relative to the workpiece 144 can also be known. Further, knowledge of the location of the first and second vision devices 114a, 114b can include knowledge of the locations of features that are within the field of view of the vision devices 114a, 114b.

Thus, at step 316, with such information, the vision guidance system 114 or a another controller or system of the robot system 100 can predict a particular portion of the area within the captured image(s) 154, 156 from the first and/or second vision devices 114a, 114b at which pose can be expected to be located. Such a predicted area can thus be less than the entire area captured in the image(s) 154, 156, thereby decreasing the amount of data and information from the captured image(s) 154, 156 that the vision guidance system 114, or other controller or system, is to process in connection with locating the tracking feature 150, 152 in the captured image(s) 154, 156.

At step 318, using the predicted location at which the pose is expected to be found in the captured image(s) 154, 156, the vision guidance system 114 can proceed with locating the pose in the image 154, 156. Once the pose is located, then at step 320 the process 300 can resume with tracking the tracking feature 150, 152 during the assembly process. Additionally, the predicted three-dimensional location of the tracking workpiece 144 relative to vision device 114a can be used to as an initial pose of the workpiece 144, which can allow for a relatively fast and robust three-dimensional pose estimation of workpiece 144, and which assist in calculating the three-dimensional location and orientation of the workpiece 144 based on a three-dimensional tracking feature 150, 152 in in the captured image(s) 154, 156.

Figure 7:
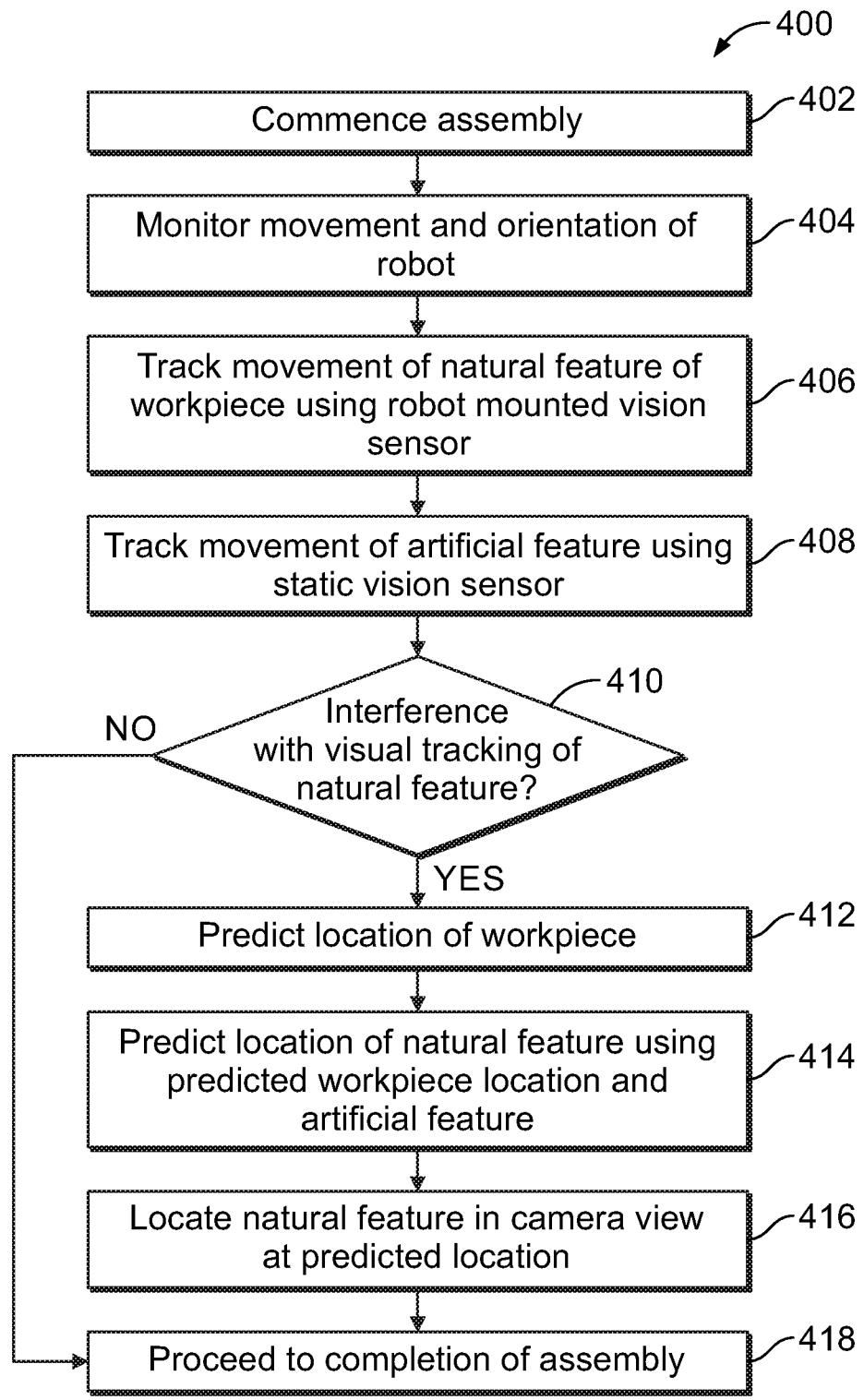
FIG. 7 illustrates another process for visual object tracking for a robot system according to an embodiment of the subject application The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

FIG. 7 illustrates another process 400 for visual object tracking for a robot system 100 according to an embodiment of the subject application. Similar to the process 300 discussed above with respect to FIG. 6, the process 400 depicted in FIG. 7 can include a first vision device 114a that is mounted to a robot 106 at a known location relative to the robot 106, and second vision device 114b that remains at a relatively static location. At step 402, the assembly can commence, and, as with the prior processes 200, 300, the movement of the robot 106, including the location of the robot 106 can be monitored at step 404. Again, as discussed above with respect to the other processes 200, 300, such monitoring of the movement of the robot 106 can be used to at least determine the location of the first vision device 114a.

Further, according the illustrated embodiment, during step 406, as the workpiece 144 is generally continuously moved during the assembly, such as, for example, via operation of the AGV 138, the first vision device 114a that is mounted to the robot 106 can track a natural tracking feature 151, such as, for example, a hole in the workpiece 144 (FIG. 4) that is being used in the current assembly, such as, for example, in connection with the robot attaching a door to the workpiece 144. Thus, the location of the natural tracking feature 152 can be known relative to the location of the workpiece 144.

Similarly, at step 408, the as the workpiece 144 is moving along during the assembly, the static second vision device 114b can track an artificial tracking feature 150, such as, for example, QR code (FIG. 4) that is mounted onto, or around the workpiece 144, AGV 138, or other location in the robot station 102. Further, according to the illustrated embodiment, the artificial tracking feature 150 can be at a location that is relatively distant or remote from the natural tracking feature 152.

As previously mentioned, during at least some assembly operations, or in certain instances, noise can interfere with the ability of the first vision device 114a to detect the natural tracking feature 152. Indeed, a previously discussed, compared to artificial tracking features 150, natural tracking features 152 can generally be more susceptible to noise, which can thus result in natural tracking features 152 generally being more difficult to track than artificial tracking features 150. Thus, if noise is determined to interfere with the first vision device 114a being able to, or being able to accurately, track and/or detect the natural tracking feature 152, then at step 412 the location of the workpiece 144 can be predicted. Such a prediction of the location of the workpiece 144 can be attained in a manner that is similar to that discussed above with respect to at least step 210 of the process 200 illustrated in FIG. 5. Moreover, similar to step 210, the prediction of the location of the workpiece 144 at step 212 can include use of historical movement of the workpiece 144, as well as information recorded regarding the speed and acceleration/deceleration of the workpiece 144 during the current assembly.

At step 414, using the predicted location of the workpiece 144, as determined at step 412, and information from the second vision device 114b regarding the current location of the artificial tracking feature 150, the vision guidance system 114 or a another controller or system of the robot system 100 can predict the location of the natural tracking feature 150. For example, according to certain embodiments, the predicted location of the workpiece 144 relative to the known location of the artificial tracking feature 150 can be used to derive a predicted location for the artificial tracking feature 150.

Using the predicted location of artificial tracking feature 150, at step 416 the system can attempt to locate the natural tracking feature 152. For example, according to certain embodiments, the predicted location of artificial tracking feature 150 can be used to determine commands to move the robot 106, and thus the first vision device 114a that is mounted to the robot 106, to a location that the natural tracking feature 152 is predicted to be captured in an image(s) 156 by the first vision device 114a. Alternatively, or additionally, the predicted location of the first vision device 114a, based on movement of the robot 106 using information regarding the predicted location of the artificial tracking feature 150, can provide the location at which the natural tracking feature 152 is expected to be seen in the captured image 156, thereby potentially reducing the area of the captured image 156 that is to be analyzed in connection with attempting to locate the natural tracking feature 152. Upon detection of the natural tracking feature 152 using the first vision device 114a, the process 300 can resume at step 418 with first vision device 114a resuming tracking the natural tracking feature 152 as the assembly process proceeds toward completion.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method comprising:
monitoring a movement of a robot;
tracking, using a vision device mounted to the robot, a location of a tracking feature of a workpiece;
predicting, as the tracking feature moves, a location of the tracking feature relative to the vision device;
predicting, using at least the predicted location of the tracking feature relative to the vision device, a captured location at which the tracking feature will be located within one or more images captured by the vision device; and
detecting, using the predicted captured location, the tracking feature within the one or more images.

2. The method of claim 1, wherein predicting the captured location further comprises determining, using the monitored movement of the robot and the predicted location of the tracking feature, a three-dimensional location of the vision device relative to the tracking feature.

3. The method of claim 1, further including the step of detecting, while the tracking feature is moving, an interference in the tracking of the tracking feature, and wherein predicting the location of the tracking feature is in response to the detected interference.

4. The method of claim 1, wherein predicting the location of the tracking feature includes:
   predicting a location of the workpiece using at least historical workpiece movement information regarding a positon of the workpiece, a speed of movement of the workpiece, and an acceleration or deceleration of the workpiece; and
   determining, using at least the predicted location of the workpiece, the predicted location of the tracking feature.

5. The method of claim 4, wherein predicting the location of the tracking feature includes determining a predicted location of the tracking feature using historical tracking information obtained from prior workpieces.

6. The method of claim 1, wherein the predicted captured location is located within only a portion of a field of view that is captured in the one or more images.

7. The method of claim 1, wherein detecting the tracking feature in the predicted captured location comprises searching only a portion of the one or more images in which the predicted captured location is located for the tracking feature.

8. The method of claim 1, wherein the step of tracking is performed by a first vision device, and the tracking feature is a natural tracking feature, wherein the method further comprises:
   tracking, by a second vision device, an artificial tracking feature of the workpiece;
   detecting an interference with the tracking of the natural tracking feature as the workpiece is moving;
   predicting a location of the moving workpiece using historical workpiece movement information, and
   wherein the step of predicting the location of the tracking feature comprises predicting the location of the natural tracking feature using at least the predicted location of the workpiece and information from the tracking of the artificial tracking feature.

9. A method comprising:
   monitoring a movement of a robot;
   determining, using the monitored movement of the robot, a location of a vision device that is mounted to the robot;
   tracking, using the vision device, a location of a tracking feature of a workpiece as the workpiece moves;
   predicting, in response to an interference in the tracking of the tracking feature, a location of the tracking feature relative to the vision device using at least movement information of at least one of the workpiece and the tracking feature;
   predicting, using at least the predicted location of the tracking feature and the determined location of the vision device, a captured location at which the tracking feature will be located within one or more images captured by the vision device; and
   detecting, using the predicted captured location, the tracking feature within the one or more images.

10. The method of claim 9, further including detecting, during movement of the workpiece, the interference in the tracking of the tracking features.

11. The method of claim 9, wherein information of movement of the workpiece comprises at least historical workpiece movement information regarding a positon of the workpiece, a speed of movement of the workpiece, and an acceleration or deceleration of the workpiece.

12. The method of claim 9, wherein information of movement of the tracking comprises at least historical tracking feature movement information regarding a positon of the tracking feature, a speed of movement of the tracking feature, and an acceleration or deceleration of the tracking feature.

13. The method of claim 9, wherein the step of predicting the location of the tracking feature further uses historical movement information from at least one of prior workpieces and prior tracking features.

14. The method of claim 9, wherein the predicted captured location is located within only a portion of a field of view that is captured in the one or more images.

15. The method of claim 9, wherein detecting the tracking feature in the predicted captured location comprises searching only a portion of the one or more images in which the predicted captured location is located for the tracking feature.

16. The method of claim 9, wherein the tracking feature is either a natural tracking feature or an artificial tracking feature.

17. The method of claim 9, wherein the step of tracking is performed by a first vision device, and the tracking feature is a natural tracking feature, wherein the method further comprises:
   tracking, by a second vision device, an artificial tracking feature of the workpiece;
   detecting an interference with the tracking of the natural tracking feature as the workpiece is moving;
   predicting a location of the moving workpiece using historical workpiece movement information, and
   wherein predicting the location of the natural tracking feature comprises predicting the location of the natural tracking feature using at least the predicted location of the workpiece and information from the tracking of the artificial tracking feature.

18. A method comprising:
   monitoring a movement of a robot;
   tracking, using a first vision device mounted to the robot, a tracking feature of a workpiece;
   tracking, using a second vision device, the tracking feature, the second vision device being at a relatively static position;
   combining tracking information obtained by both the first vision device and the second vision device from tracking the tracking feature;
   generating, using at least the combined tracking information, a pose of the tracking feature, the pose being generated in three-dimensions;
   predicting, as the tracking feature moves, a location of the pose, the predicted location providing predicted coordinates for the pose;
   predicting, using at least the predicted location of the pose and the monitored movement of the robot, a captured location at which the pose will be located within one or more images captured by the first vision device; and
   detecting, using the predicted captured location, the pose within the one or more images.

19. The method of claim 18, wherein predicting the captured location further comprises determining, using the monitored movement of the robot, a location of the first vision device that is mounted to the robot relative to the tracking feature.

20. The method of claim 19, further including the step of detecting, while the tracking feature is moving, an interference in at least the first vision device tracking of the tracking feature, and wherein predicting the location of the pose is in response to the detected interference.

* * * * *